United States Patent [19]

Beauvais et al.

[11] Patent Number: 4,840,137
[45] Date of Patent: Jun. 20, 1989

[54] LIQUID LEVEL GAUGING APPARATUS

[75] Inventors: Thomas Beauvais, Hamden; Vincent G. Krenke, Fairfield; Peter J. Lupoli, Hamden; Donald J. Mattis, Norwalk, all of Conn.

[73] Assignee: Casco Products Corporation, Bridgeport, Conn.

[21] Appl. No.: 266,577

[22] Filed: Nov. 3, 1988

Related U.S. Application Data

[63] Continuation of Ser. No. 68,575, Jul. 1, 1987, abandoned.

[51] Int. Cl.⁴ .............................................. G01F 23/02
[52] U.S. Cl. ..................................... 116/227; 73/293; 250/577; 340/619
[58] Field of Search ......................... 73/293, 327, 291; 350/96.1, 96.21; 116/227; 250/577; 340/620

[56] References Cited

U.S. PATENT DOCUMENTS

| | | |
|---|---|---|
| 1,883,971 | 10/1932 | Kryzanowsky . |
| 2,368,705 | 2/1945 | Du Pont et al. ....................... 73/327 |
| 2,620,660 | 12/1952 | Goldsmith . |
| 2,704,454 | 3/1955 | Martin . |
| 3,054,291 | 9/1962 | Landwer . |
| 3,263,553 | 8/1966 | Baruch . |
| 3,299,770 | 1/1967 | Witt et al. . |
| 3,367,184 | 2/1968 | McHugh . |
| 3,448,616 | 6/1969 | Wostl et al. . |
| 3,543,581 | 12/1970 | Ryder ................................... 73/327 |
| 3,553,666 | 1/1971 | Melone ................................. 73/293 |
| 3,589,191 | 6/1971 | Kelch, Jr. ............................. 73/327 |
| 3,751,672 | 8/1973 | Michel et al. . |
| 3,766,395 | 10/1973 | Keir . |
| 3,796,098 | 3/1974 | Trayer ................................... 73/327 |
| 3,818,470 | 6/1974 | Hirsbrunner et al. . |
| 3,834,235 | 9/1974 | Bouton et al. . |
| 3,850,528 | 11/1974 | DeBellis . |
| 3,917,411 | 11/1975 | Schweizer et al. . |
| 3,932,038 | 1/1976 | Schweizer et al. . |
| 3,977,790 | 8/1976 | Schweizer et al. . |
| 3,995,169 | 11/1976 | Oddon . |
| 4,037,967 | 7/1977 | Schweizer et al. . |
| 4,134,022 | 1/1979 | Jacobsen . |
| 4,155,013 | 5/1979 | Spiteri . |
| 4,242,590 | 12/1980 | von Tluck . |
| 4,306,805 | 12/1981 | Arrington . |
| 4,320,291 | 3/1982 | Uramoto . |
| 4,354,180 | 10/1982 | Harding . |
| 4,468,567 | 8/1984 | Sasano et al. . |
| 4,583,293 | 4/1986 | Smith . |
| 4,638,663 | 1/1987 | Seelhorst . |
| 4,644,177 | 2/1987 | Barabino . |
| 4,684,417 | 8/1987 | Grandclement ................ 250/577 X |
| 4,711,126 | 12/1987 | Houpt et al. ......................... 73/293 |
| 4,713,552 | 12/1987 | Denis ................................... 250/577 |

FOREIGN PATENT DOCUMENTS 0412803 7/1934 United Kingdom .

OTHER PUBLICATIONS

Aeroquip Tedeco Division Bulletin TDB L250, 1987, Tedeco Division, 24 E. Glenolder Ave., Glenolder, Pa. 19036 (2 pages).
Aeroquip Tedeco Division Product Information and Application News, TTN-2, Summer 1986, Same Address as Ref. "AR", (2 pages).

*Primary Examiner*—Daniel M. Yasich
*Attorney, Agent, or Firm*—Mitchell D. Bittman

[57] ABSTRACT

A liquid level gauging system and sensor device for installation in the aperture of a wall of a liquid-containing vessel, including a metal fitting having a through bore and a substantially cylindrical body portion with external threads by which it can be secured in the aperture in the vessel wall, a cup-like enclosure disposed in the bore, the enclosure having a bottom wall containing a prism disposed adjacent the inner end of the bore, and a light source and a light-responsive device mounted in the enclosure. The prism has a substantially conical forward end portion for immersion in the liquid to be monitored. The conical forward end portion of the prism is characterized by an axis, and the prism has a light-admitting and light-transmitting conical recess coaxial with the conical end portion of the prism. Light rays from the source that pass into the surface of the conical recess are bent, by refraction, toward the conical end portion. Reflected rays from the conical end portion passing outwardly through the surface of the conical recess are similarly bent, by refraction, toward the light-responsive means. Especially high resolution and accuracy are possible, while maintaining good reliability and repeatability.

19 Claims, 8 Drawing Sheets

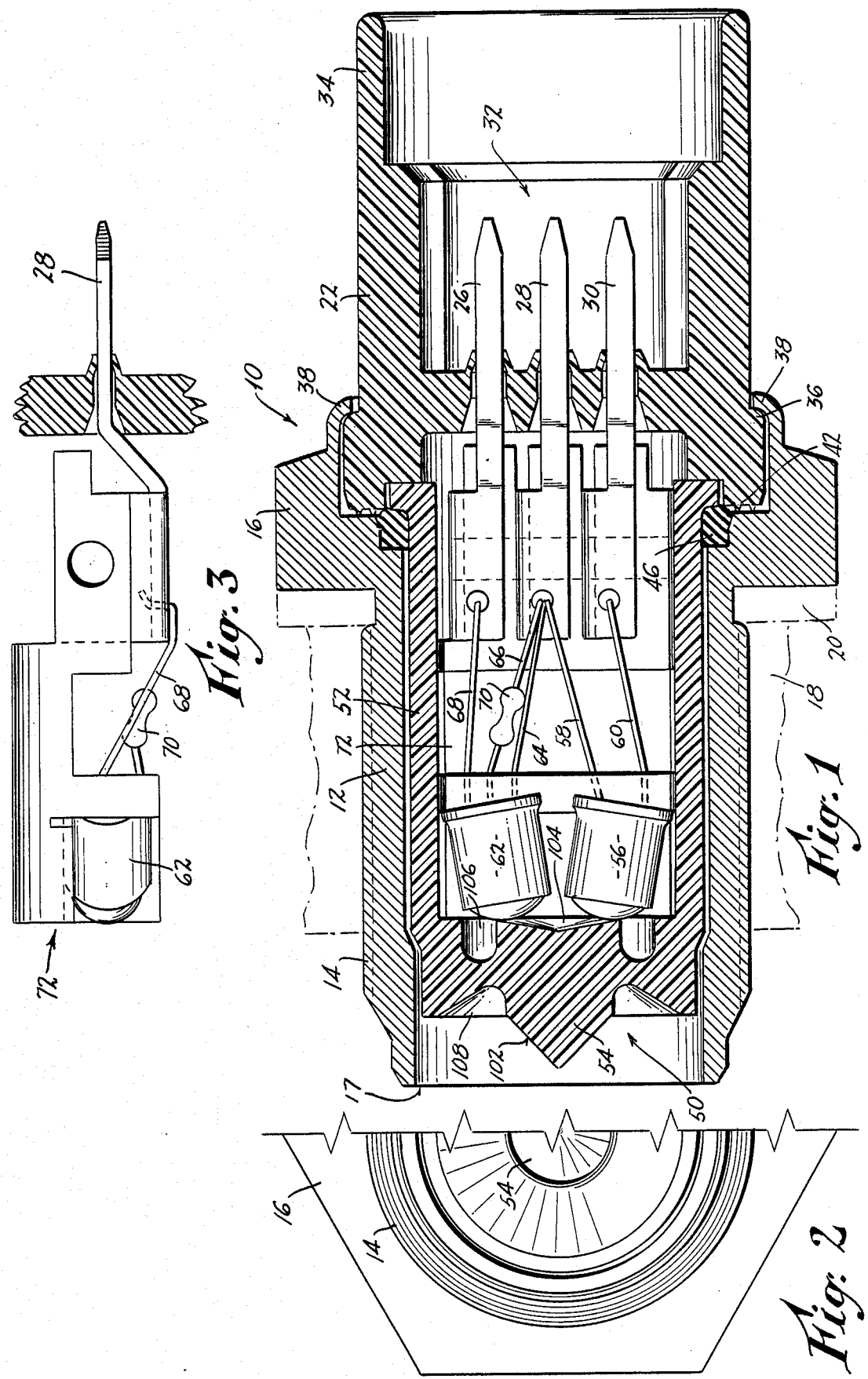

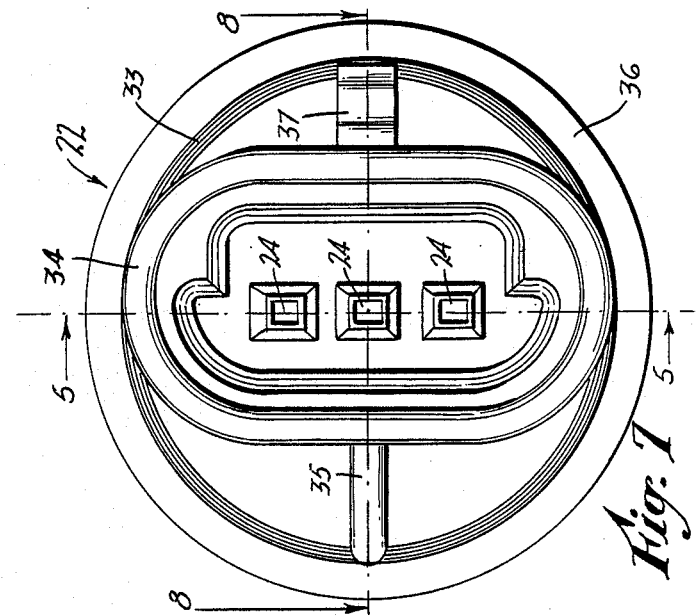
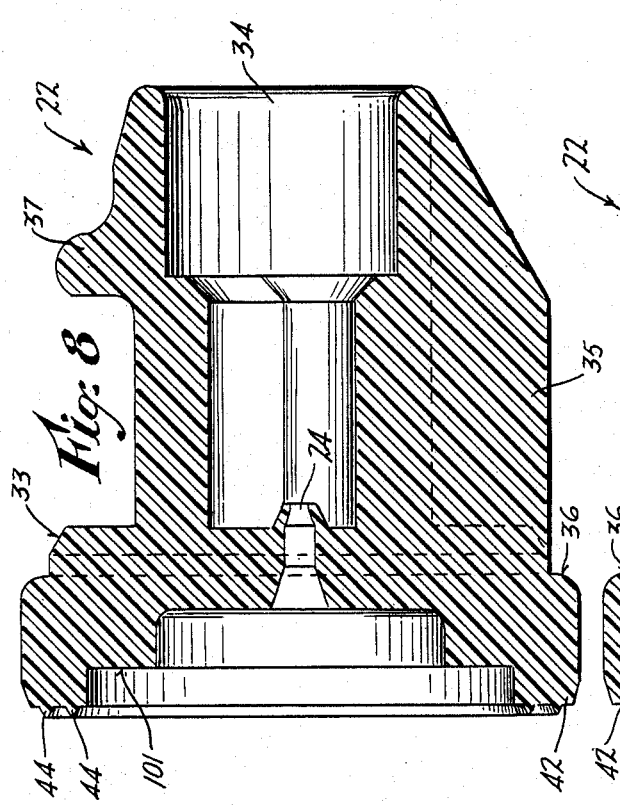
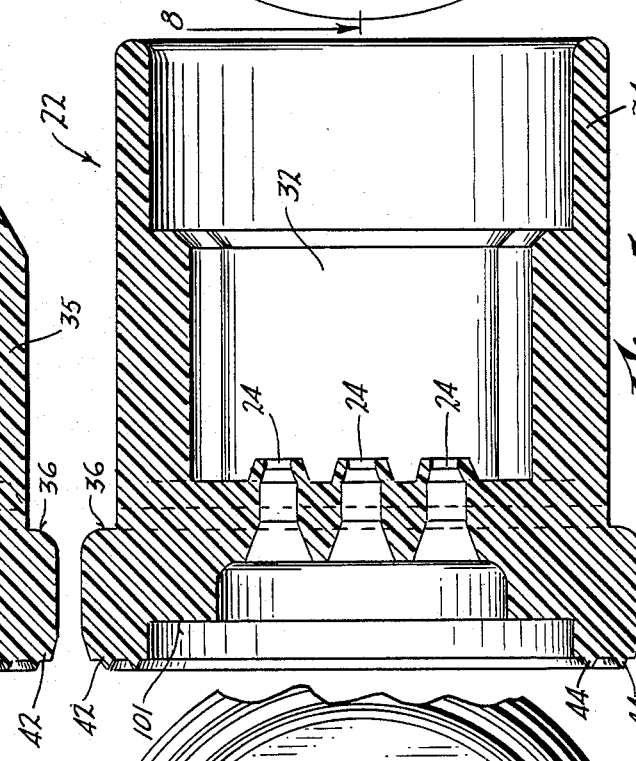
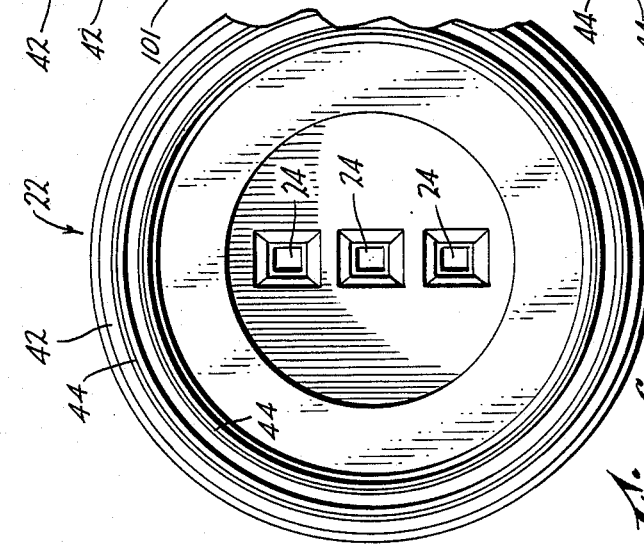

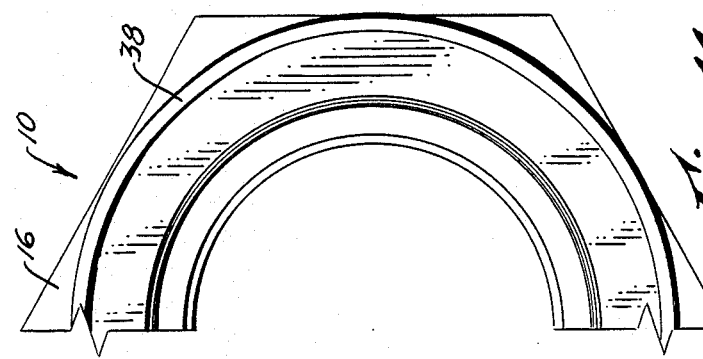
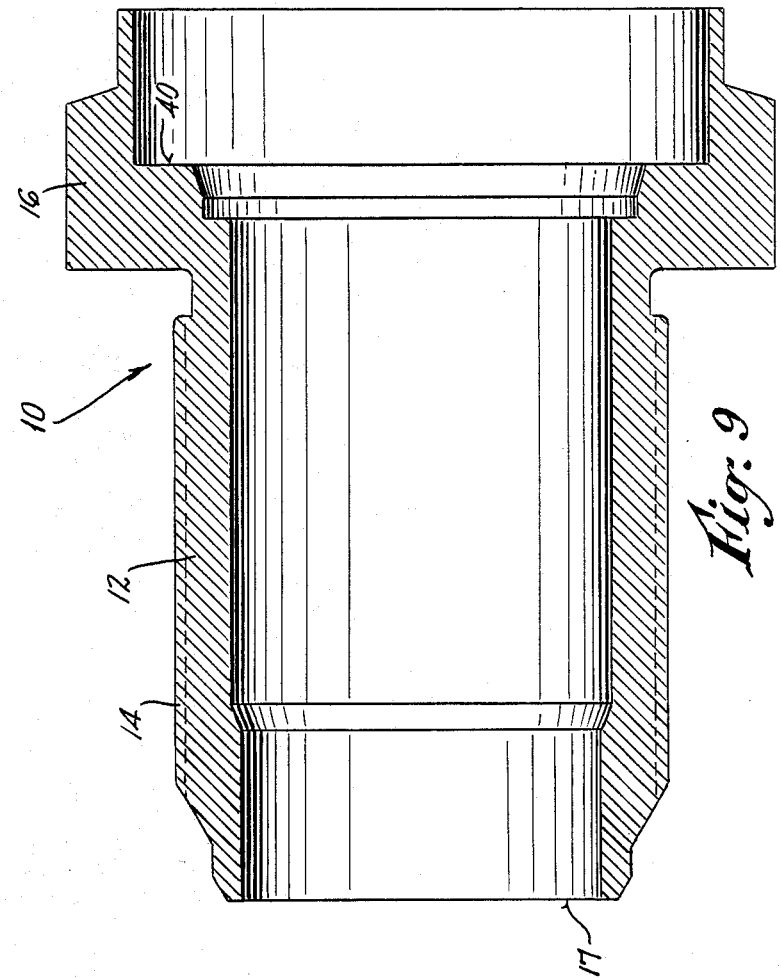
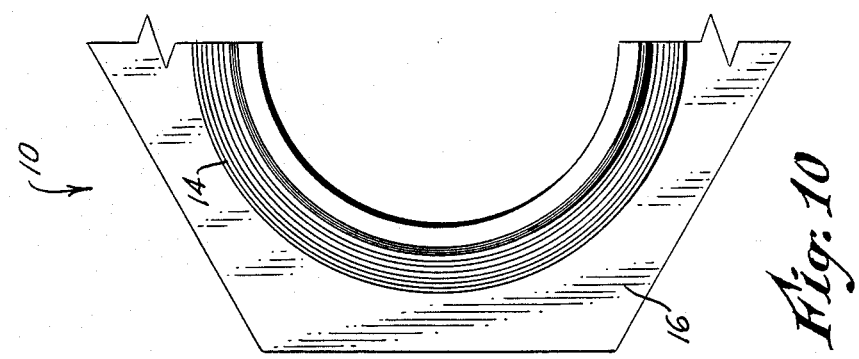

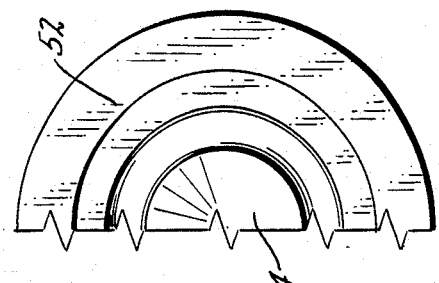
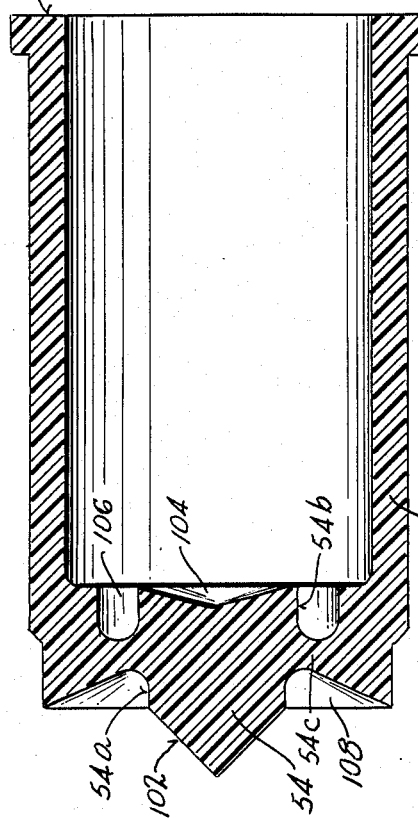
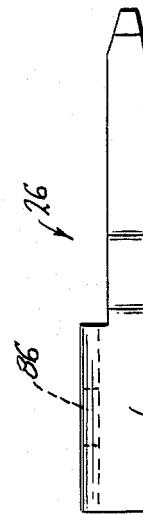
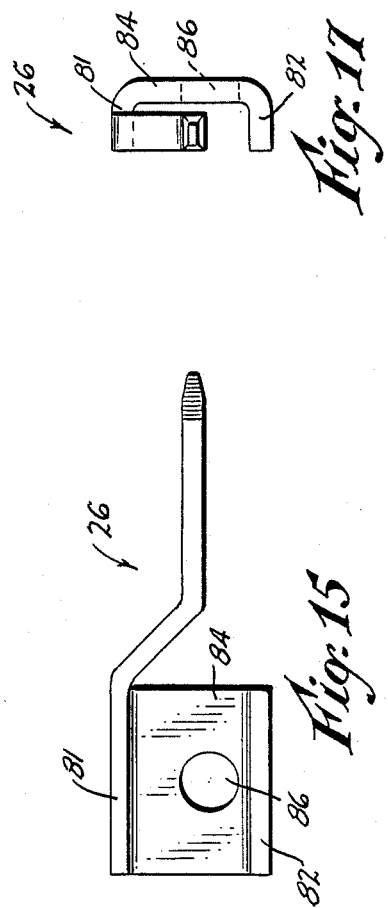
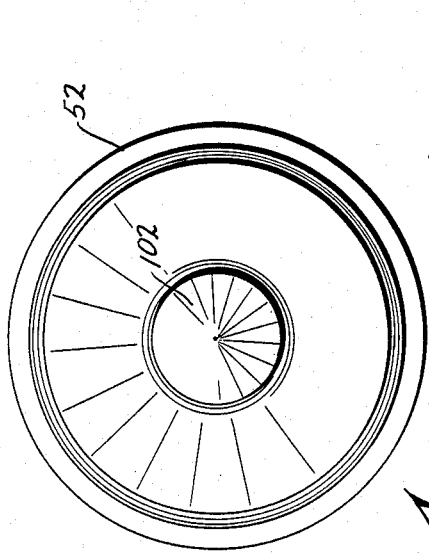
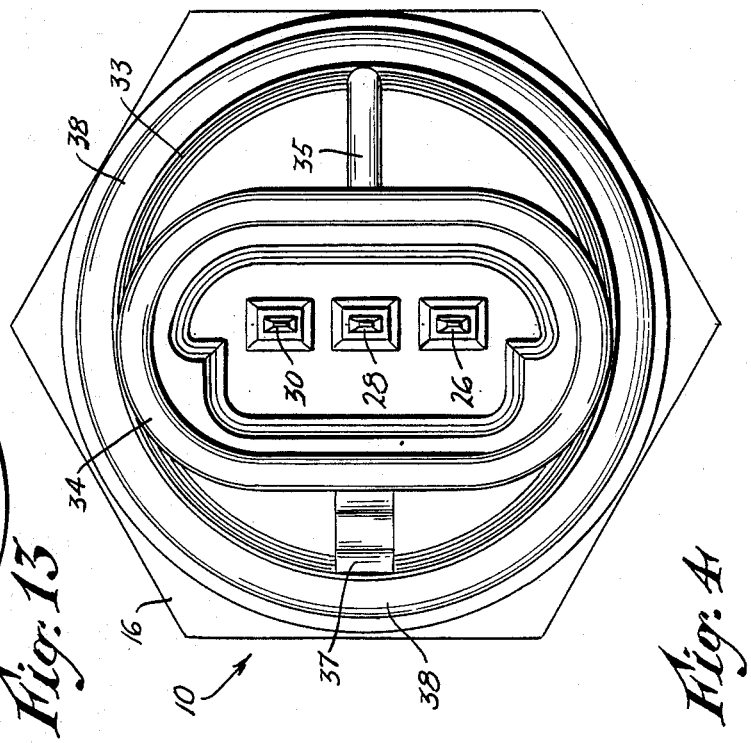
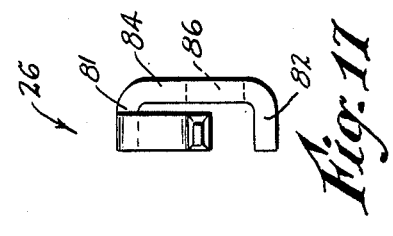

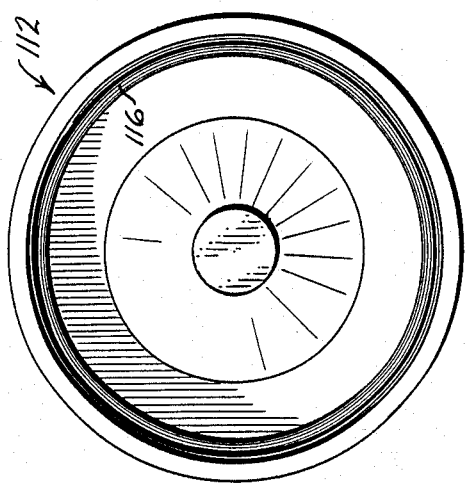
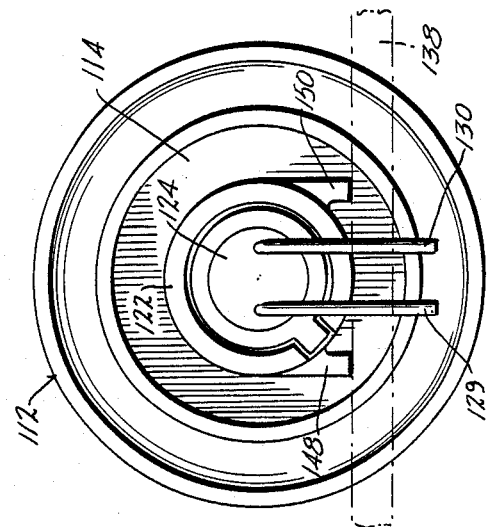
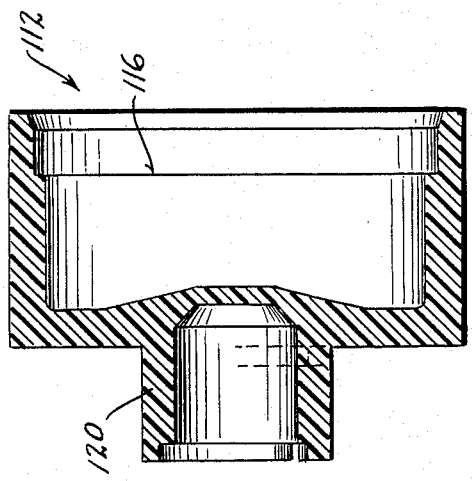
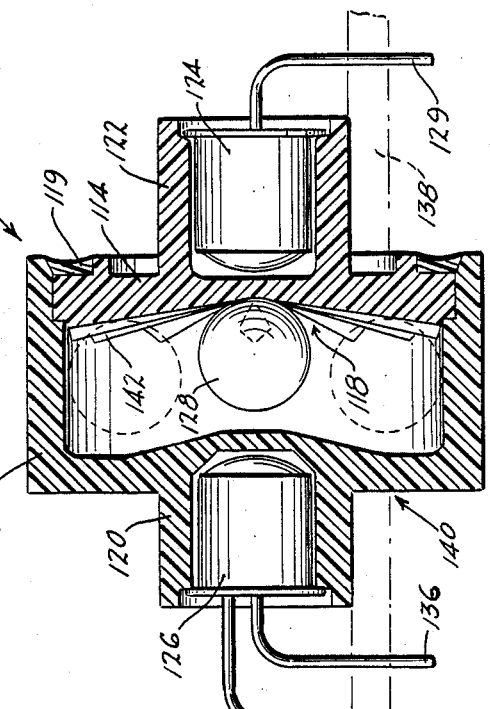
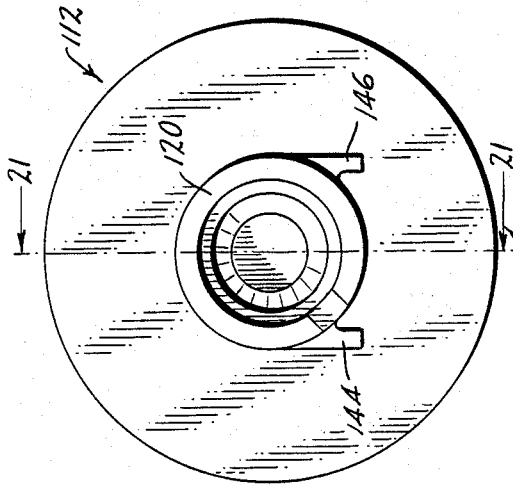
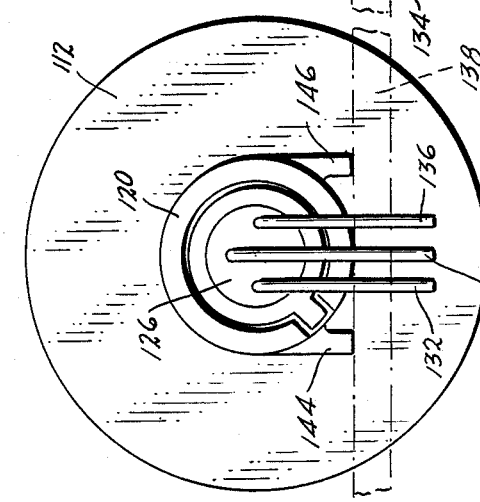

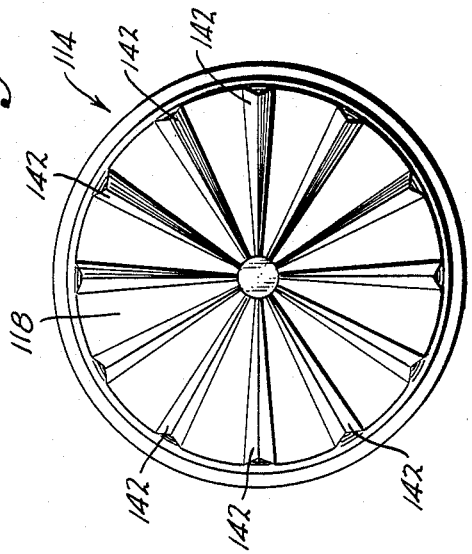
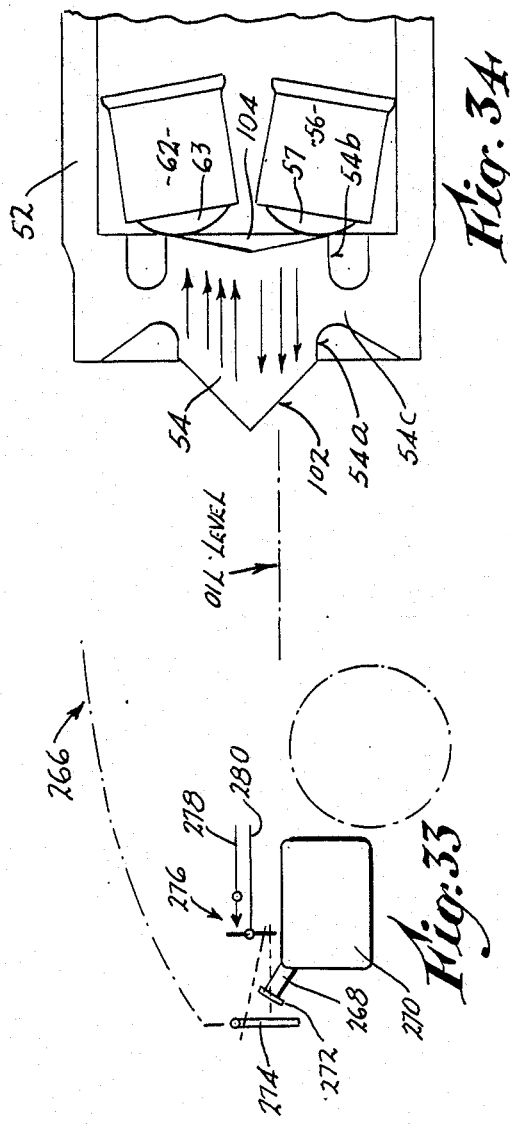
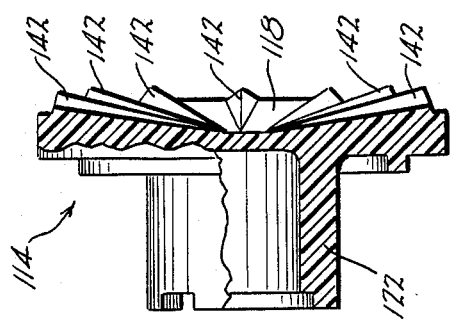
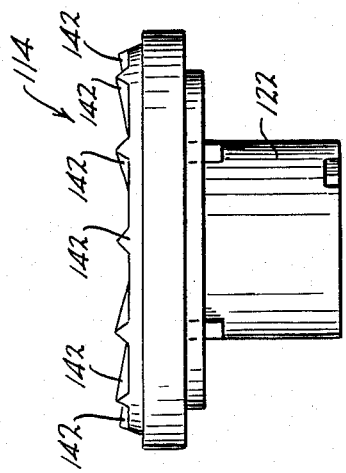
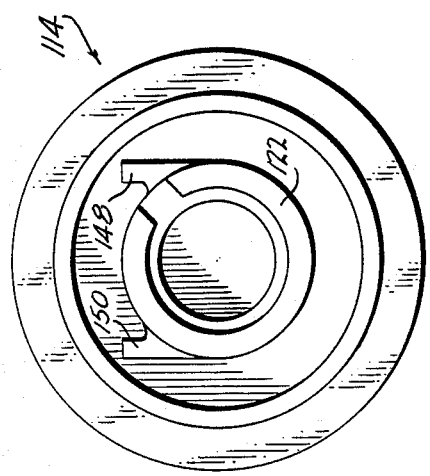

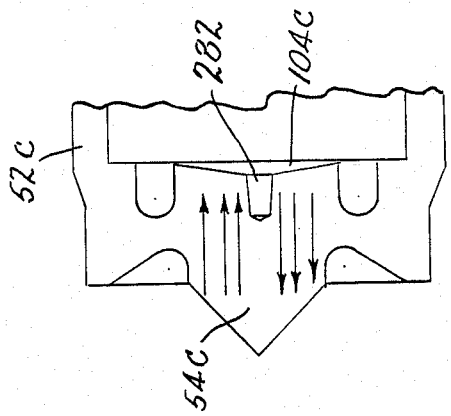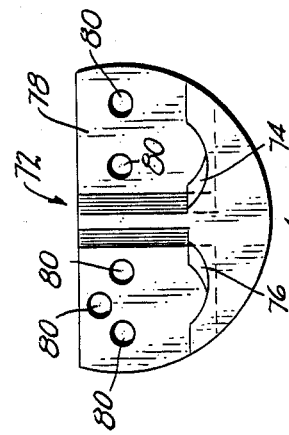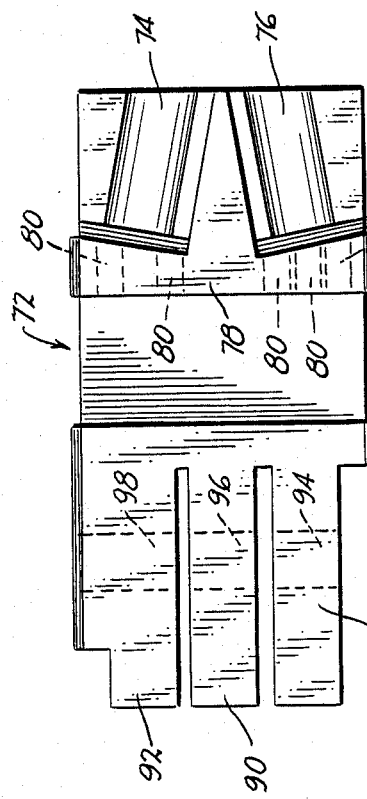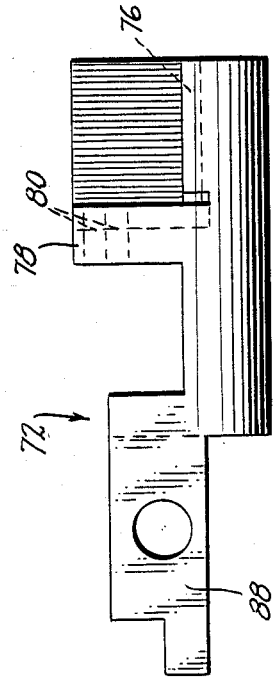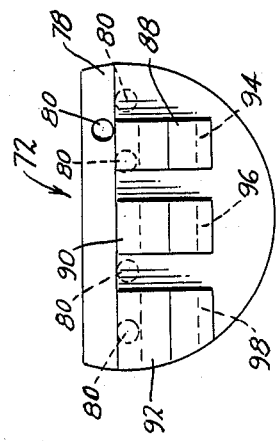

LIQUID LEVEL GAUGING APPARATUS

This is a continuation of application Ser. No. 07/068,575, filed July 1, 1987 and now abandoned.

BACKGROUND OF THE INVENTION

1. Field of the Invention

This invention relates generally to liquid level gauging systems, and more particularly to those employing a light-conducting rod, light source, and light-receiver, and wherein the reflective properties at the surfaces of the rod change as it becomes immersed in the liquid being gauged, such change being detected by the light-receiver.

2. Description of the Related Art Including Information Disclosed Under 37 CFR §§1.97–1.99

A typical apparatus of the type noted above is illustrated and described in U.S. Pat. No. 3,448,616 dated June 10, 1969, and issued to W. Wostl et al. The patent discloses a light-conductive rod which employs the well-known physics "law of refraction", to measure liquid levels. The rod is tapered, and constituted of transparent material. There is provided a source of light and a photodetector at the upper end of the rod, which is intended to be mounted vertically in a tank or vessel. As the level of liquid in the tank rises, immersing a greater portion of the lower end of the rod, there is less light reflected from the rod-liquid interface, and consequently the intensity of the light received by the photodetector is reduced. The photodetector thus provides an indication related to that portion of the rod which is immersed at any particular time, this in turn providing an indication of the level of the liquid in the tank.

Another arrangement is illustrated in U.S. Pat. No. 3,299,770 dated Jan. 24, 1967, and issued to W. Witt et al. The disclosed device is employed to measure liquid levels in a conduit; it incorporates a transparent rod of substantially uniform diameter, having a light-reflecting surface at its lower end. Measurement of the liquid level is made by directing a beam of light downwardly through the rod, and detecting a portion of the beam that is reflected from the rod-liquid interface, by means of a photocell. The intensity of the reflected beam is a function of the liquid level in the conduit.

Similar devices are illustrated in U.S. Pat. Nos. 3,766,395; 3,834,235; 4,134,022; 4,242,590; 4,354,180; and 4,458,567.

Also, U S. Pat. Nos. 3,917,411; 3,932,038 and 3,977,790 illustrate various types of transparent rods that utilize the law of refraction for monitoring liquids. In contrast to the devices which are the subject of the patents listed in the previous paragraph, these three patents show gauges that measure the density or specific gravity of a liquid. In such cases, the photosensitive devices associated with the rods receive an amount of light which varies with such density or specific gravity.

In most of the above patented devices, the transparent rod was exposed for a major portion of its length and was thus susceptible to bumping or jarring, especially during handling or installation. Since the materials employed were usually plastic or glass, there existed a danger of fracture, breakage, or chipping of the transparent portion, which would render the device inoperative.

In addition, most of the liquid level sensors shown in the above identified patents were intended for installation in a substantially vertical position on a vessel housing; that is, they were usually mounted on an upper cover thereof with the transparent part extending vertically downward. While this was satisfactory for many installations, space requirements did not always permit mounting in this manner. In particular, devices intended to monitor oil level in a motor vehicle's oil pan could not be mounted directly over the pan, since this area is occupied by the engine's pistons and cylinders.

Accordingly there has existed a need for a gauge that would be both rugged and reliable, and capable of being mounted on a vertical wall of an oil pan. Absence of moving parts of any kind was also felt to be an important consideration, due to the fact that mechanical floats and switches associated therewith were in some cases considered to be unreliable. In addition, mechanical gauges have not found acceptance in oil monitoring systems for motor vehicles, mostly due to the wide range of temperatures occurring at the oil pan, together with the harsh environment involving mechanical shock, and vibration of the engine during operation.

One type of gauge especially intended for monitoring the level of oil in an oil pan is shown in U.S. Pat. No. 3,939,470. This patented device utilized two sensors comprising thermal variable resistance elements, the first element being located in one vertical wall of the pan, with the other being on an adjacent wall, perpendicular to the first. This arrangement constituted an attempt to compensate for errors which would occur where oil level readings were taken at times that the vehicle was not disposed on a level surface. For example, when the vehicle was parked on a hill and where a single sensing element was employed, a false reading would likely be indicated, depending on the location of the sensing element about the pan walls, and the direction of tilting of the vehicle.

While this patent appears to address the problem involving erroneous readings resulting from tilting of the vehicle, the solution of providing dual sensing elements constitutes a compromise at best. In addition, as presently understood, it is believed that false readings could still occur if the vehicle were either tilted toward one side or tilted from front to back, and vice-versa.

Finally, it is believed that optical sensors of the type incorporating a conical tip which becomes immersed in the liquid being gauged have, up to the present time, been designed to operate with the axis of the cone lying along a vertical line. We have discovered that a surprising and unexpectedly advantageous result can be obtained if a sensor employing a conical tip is mounted with the axis of the cone substantially horizontal, for example, as where the sensor is mounted in a vertical wall of the oil pan of an automotive vehicle. Further, an unusually high degree of resolution can be obtained, whereby excursions into an area of the sensor unit on the order of 3 millimeters in length can be detected, with excellent repeatability and reliability.

SUMMARY OF THE INVENTION

The above disadvantages and drawbacks of prior liquid gauging systems are obviated by the present invention, which has for one object the provision of a novel and improved small and compact optical-type liquid gauging system which is both simple in construction and protected against breakage, whereby it is rugged and reliable in operation even over extended periods of use.

A further object of the invention is to provide an improved liquid gauging system as above set forth, which automatically detects the inclination of the vehicle, and prevents false or erroneous readings from being relayed to the vehicle operator when the vehicle is not located on substantially flat, horizontal ground.

A still further object of the invention is to provide an improved liquid gauging system as outlined above, wherein readings of liquid level are automatically initiated in response to a particular activity involving the driver of the vehicle, such as opening of a door, or other activity involving service of the vehicle, as for example, uncovering of the gas-filler cap or removal of such cap at a service station.

A related object of the invention is to provide an improved liquid gauging system as above indicated, which is characterized by compactness and small size, and also a high degree of accuracy and resolution.

Still another object of the invention is to provide an improved liquid gauging system as above characterized, wherein a transparent prism having a conical tip is provided with annular grooves which enhance its effectiveness, such prism being advantageously operable even when mounted in a manner that the axis of the cone is substantially horizontal.

Yet another object of the invention is to provide an improved liquid gauging system of the kind indicated, whereby undesirable leakage of the liquid being monitored is prevented, thereby eliminating inadvertent loss, and the need for periodic replacement resulting from such loss.

A further object of the invention is to provide a small and extremely compact, unique sensing assemblage adaptable for use in different environments and positions, and with different electronic control and indicating systems or circuits for the purpose of revealing the level of a liquid in a container.

The above objects are accomplished by the provision of a unique liquid level indicator unit for installation in the aperture of a wall of a liquid-containing vessel, comprising a metal fitting having a substantially cylindrical body portion with a through bore, having external threads by which it can be secured in the aperture in the vessel wall, and having a cup-like enclosure disposed in the bore. The cup-like enclosure has a bottom or inner wall comprising an inwardly-disposed prism located adjacent the inner end of the bore. The prism has a substantially conical forward end portion for immersion in the liquid to be monitored. The side walls of the enclosure are juxtaposed to the side walls of th fitting body portion. There are provided a light source and a light-responsive means, and means for mounting the same in the enclosure. The prism has a rearwardly-located light-admitting and light-transmitting substantially conical recess formation which is essentially coaxial with the conical end portion of the prism, whereby light rays from the light source that pass into the surface of the conical recess are bent, by refraction, toward the conical forward end portion, and reflected rays from the conical forward end portion passing outwardly, through the surface of the conical recess are bent, by refraction, toward the light-responsive means.

The unique indicator unit is further characterized by a cup-shaped, liquid-tight molded body of light-transmitting plastic substance having an integral transverse bottom wall comprising a prism formation which is so arranged that precise and useful readings can be obtained therefrom even though the body is mounted either vertically or horizontally in or on the walls of the container for the liquid. Disposed in the body in juxtaposition to the prism formation are a miniature light-emitting device and a miniature light-responsive device, located side by side to respectively supply light and to receive light from the prism formation. The side-by-side devices are angularly disposed with respect to each other, and face a conical recess in the prism formation, to reduce size and improve the compactness of the unit. The small size enables the entire unit to fit within the confines of a relatively small aperture in the container wall. To facilitate the mounting, the aperture of the container wall can be threaded, and the sensing assemblage can be carried in a threaded bushing which is screwed into the aperture with a liquid-tight seal.

Other features and advantages will hereinafter appear.

BRIEF DESCRIPTION OF THE DRAWINGS

In the drawings, illustrating a preferred embodiment of the invention:

FIG. 1 is an axial section of the sensor unit of the gauging system of the present invention, particularly showing a threaded fitting and connector block, a cup-shaped sensor body with a prismatic end wall, and a light source and light sensor mounted in the sensor body.

FIG. 2 is a fragmentary left end elevation of the sensor unit of FIG. 1.

FIG. 3 is a side elevation of a carrier block for the light source and light sensor of the unit of FIG. 1.

FIG. 4 is a right end elevation of the sensor unit of FIGS. 1 and 2.

FIG. 5 is an axial section of the insulating connector block of the sensor unit of FIG. 1, taken on line 5—5 of FIG. 7.

FIG. 6 is a left end elevation of the insulating connector block of FIG. 5.

FIG. 7 is a right end elevation of the insulating connector block of FIGS. 5 and 6.

FIG. 8 is an axial section of the connector block of FIGS. 5-7, taken on the line 8—8 of FIG. 7.

FIG. 9 is an axial section of the threaded fitting of the sensor unit of FIG. 1.

FIG. 10 is a left end elevation of the fitting of FIG. 9.

FIG. 11 is a right end elevation of the fitting of FIGS. 9 and 10.

FIG. 12 is an axial section of a cup-shaped sensor body having a prismatic end wall, as employed in the sensor unit of FIG. 1.

FIG. 13 is a left end elevation of the sensor body of FIG. 12.

FIG. 14 is a fragmentary right end elevation of the sensor body of FIGS. 12 and 13.

FIG. 15 is a front elevation of one of the connector prongs of the sensor unit of FIG. 1.

FIG. 16 is a top plan view of the connector prong of FIG. 15.

FIG. 17 is a right end elevation of the connector prong of FIG. 15 and 16.

FIG. 18 is an axial section of an inclination detector for a vehicle, for use in combination with the sensor unit of FIG. 1. The inclination detector is shown mounted on a printed circuit board that is intended to be vertically positioned in a suitable location on the vehicle.

FIG. 19 is a left end elevation of the inclination detector of FIG. 18.

FIG. 20 is a right end elevation of the inclination detector of FIGS. 18 and 19.

FIG. 21 is an axial section of a cup-shaped housing part of the inclination detector of FIGS. 18–20.

FIG. 22 is a left end elevation of the housing part of FIG. 21.

FIG. 23 is a right end elevation of the housing part of FIGS. 21 and 22.

FIG. 24 is a view, partly in front elevation and partly in axial section, of a second housing part of the inclination detector of FIGS. 18–20.

FIG. 25 is a left end elevation of the housing part of FIG. 24.

FIG. 26 is top plan view of the housing part of FIGS. 24 and 25.

FIG. 27 is a right end elevation of the housing part of FIGS. 24–26.

FIG. 28 is a front elevation of the carrier block for the light source and light sensor, the carrier block being also shown in FIG. 3 and being telescopically received in the cup-shaped sensor body as in FIG. 1.

FIG. 29 is a left end elevation of the carrier block of FIG. 28.

FIG. 30 is a right end elevation of the carrier block of FIGS. 28 and 29.

FIG. 31 is a top plan view of the carrier block of FIGS. 28–30.

FIG. 33 is a diagrammatic representation of an automobile and gas tank and filler pipe thereof, showing a switch arrangement responsive to tilting of the license plate or cover panel that conceals the gas filler cap, and/or responsive to removal of the filler cap for the purpose of triggering the sensor unit and electronic control of the present invention, to automatically commence a measurement of the engine oil.

FIG. 34 is a fragmentary diagrammatic representation of the axial section of the sensing unit of the invention, and FIG. 35 is a fragmentary diagrammatic representation similar to FIG. 34, of the axial section of a modified sensor body having a prismatic end wall, constituting another embodiment of the invention.

DESCRIPTION OF THE PREFERRED EMBODIMENT

Figure 32:
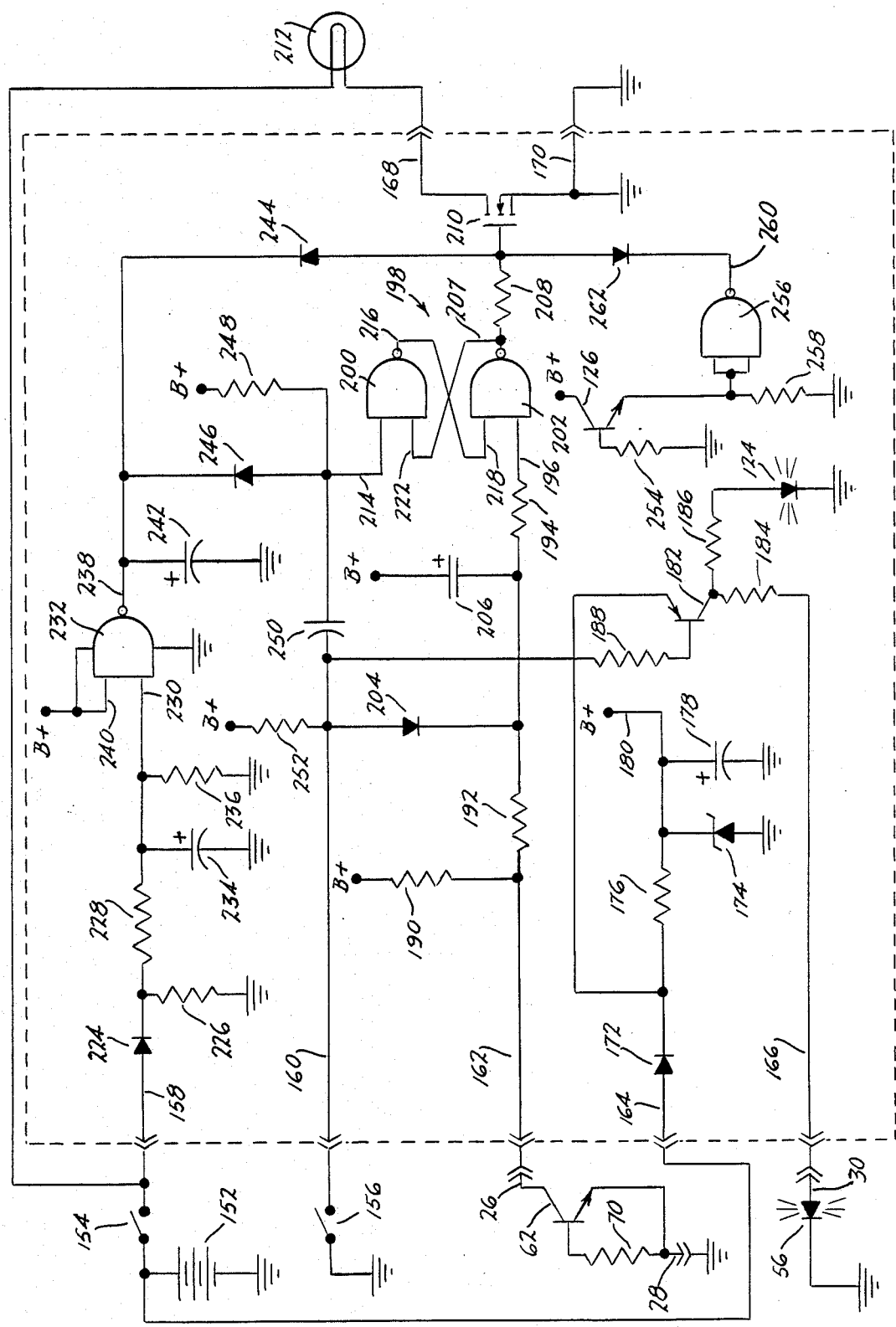
FIG. 32 is a schematic circuit diagram of the electronic control and indicator portion of the liquid level gauging system of the present invention.

Referring first to FIGS. 1 and 9–11 there is illustrated a metal fitting 10 having a body portion 12 with external screw threads 14, and a hex head 16 for engagement by a suitable wrench. The inner edge or lip of the body portion 12 is generally annular, and is designated 17. The fitting 10 is intended to be screwed into a threaded aperture in the side wall of an oil pan or other liquid-containing vessel of an automotive vehicle. In FIG. 1, the oil pan wall is designated 18. A sealing washer 20 is disposed between the head 16 and wall 18. The fitting 10 carries an insulating connector block 22, particularly shown in FIGS. 5–8, which has guide holes 24 to accommodate three electrical male terminals or prongs 26, 28 and 30, for engagement by corresponding terminals of a mating electrical connector receptacle (not shown) of the vehicle wiring harness. The connector block 22 has a cup-shaped recess 32 into which the outer ends of the prongs 26, 28 and 30 extend. The outer surface of the block 22 has an interrupted beveled surface 33, FIGS. 4, 7 and 8. A rigid oval skirt 34 on the block 22 protects the prongs 26, 28 and 30 against inadvertent damage from contact with external objects, as well as providing a seal with a boot on the mating electrical connector receptacle of the vehicle wiring harness. A rib 35 is integral with the skirt 34.

On the exterior surface of the connector block 22 is an annular shoulder 36. A flange 38 on the metal fitting 10 is laid over the shoulder 36 so as to permanently retain the connector block 22 in the position shown in FIG. 1, following installation of the other components carried by the fitting 10, as will be described below.

A projection 37 on the opposite side of the skirt is cooperable with a retainer strap on the mating receptacle (not shown), in the usual manner.

An inner annular shoulder 40, FIG. 9, on the fitting 10 is engaged by a cooperable shoulder 42 on the connector block 22. A pair of annular beads 44, FIGS. 5, 6 and 8, is preferably provided on the connector block 22, these being deformed or slightly crushed at the time that the fitting flange 38 is laid over. The provision of the beads 44 minimizes stresses in the connector block 22 by yielding if necessary, to prevent cracking. A seal between the fitting 10 and connector block 22 is provided by a suitable O-ring 46, as shown in FIG. 1. The beads 44 also provide a secondary seal, against debris lying outside the fitting and connector block.

In accordance with the present invention the fitting 10 carries a novel and improved sensor unit 50 intended to monitor the level of liquid contained in the oil pan or other vessel associated with a motor vehicle. The fitting 10 has a bore, and the sensor unit 50 is telescopically received in the bore of the fitting 10, and comprises a cup shaped enclosure or sensor body 52 shown in FIGS. 12–14, having an annular side wall, a prism 54 in its bottom wall, a light source 56 having a condensing lens 57, and having electrical leads 58, 60 connected with the prongs 28, 30 respectively, and a light-sensor 62 having a condensing lens 63, and having three leads 64, 66 and 68. Lead 64 extends to the prong 28; lead 66 extends through a series resistor 70 that is connected to prong 28, and lead 68 is connected to prong 26. The prism is preferably constituted of transparent or semi-transparent heat-resistant material, and we have found, for example, that amber-colored, general purpose polyethersulfone is well adapted for use in fabricating the cup shaped sensor body 52 and prism 54, which in the disclosed embodiment, are integral with one another. Other substances could be employed, with equally good results. The annular side wall and prism 54 are devoid of through openings, and are thus watertight. A carrier block or cradle 72 is telescopically received in the sensor body 52, as in FIG. 1, and is particularly shown in FIGS. 3 and 28–31. The carrier block 72 provides two arcuate seats 74, 76, the one seat 74 being for the light source 56, and the second seat 76 for the light-sensor 62.

Typically the light source 56 can take the form of a light-emitting diode, preferably an infrared type; the light-sensor 62 is preferably a photo-transistor.

Referring to FIGS. 28 and 31, the carrier block 72 has an upstanding positioning shoulder 78 with five holes 80, FIG. 30, through which the leads 64, 66 and 68 from the photo-transistor 62 and the leads 58, 60 from the light-emitting diode 56 pass. The physical base of the light-emitting diode 56 and that of the photo-transistor 62 rest against one surface of this positioning shoulder 78 when the light-emitting dioxide 56 and photo-transistor 62 are installed on the carrier block 72 and the carrier block inserted in the sensor body 52, as in FIG. 1.

The light-emitting diode 56 and photo-transistor 62 are held securely by their respective leads, in fixed positions in the sensor body 52, and resist movement from either mechanical shock or vibration, as occurs during vehicle operation.

The prongs 26, 28 and 30 can be substantially identical to one another, having a configuration as shown for the prong 26 in FIGS. 15-17. The body portion of the prong 26 has a substantially U-shaped cross section, comprising legs 81 and 82, and a connecting yoke 84. A transverse aperture 86 in the yoke 84 receives an insulating pin (not shown) that retains the prongs 26, 28 and 30 respectively on rearwardly-extending fingers 88, 90 and 92 of the carrier block 72, FIGS. 29 and 31. The U-shaped portions of the prongs fit around the respective fingers 88, 90 and 92. The latter have aligned transverse holes 94, 96 and 98, respectively, through which the insulating pin is passed, in accomplishing the retention of the prongs 26, 28 and 30 on the fingers of the carrier block.

After the electrical leads 58, 60 from the light-emitting diode 56, the leads 64, 68 from the photo-transistor 62, and the lead from resistor 70 are soldered to the respective prongs 30, 28 and 28, 26, the prongs are inserted into the guide holes 24 in the connector block 22, and the assemblage consisting of the carrier block 72, prongs 26, 28 and 30, O-ring 46, and connector block 22 is then assembled to the cup-shaped sensor body 52 of the sensor unit, and the resultant structure inserted telescopically into the fitting 10. An abutting surface 99 on the sensor body 52, FIG. 12, is engaged by a cooperable shoulder 101, FIGS. 5 and 8, on the connector block 22. Thereafter, the flange 38 is laid over, to retain parts in the positions of FIG. 1.

The prism 54 at the exterior or forward end of the sensor body 52 has a conical extension or cone surface 102. The surface 102 of the extension is intended for immersion in the liquid being gauged. By the invention, the cone surface 102 of the prism 54 is substantially completely recessed within the inner edge portion of the fitting 10, such that the fitting protects the surface 102 and remainder of the prism from scratches, chipping, or breakage due to inadvertent bumping, jarring or contact with other objects, as might otherwise occur during fabrication, handling, shipping or installation. In addition, where completed units are subjected to routine "drop testing", by quality control personnel, the present arrangement affords the required protection for the prism.

In accordance with the present invention there is provided, at the inner surface of the bottom wall of the sensor body 52, a substantially conical recess 104 having an axis which is generally aligned with that of the cone surface 102. Further, by the invention, each of the components 56, 62 is mounted on the carrier block 72 at a predetermined angle with respect to the axis of the cone surface 102, and an annular trough 106 is provided, surrounding the conical recess 104 and constituting a sharply defined area which encircles it, through which area light can pass.

FIG. 34 illustrates in particular the basic arrangement and action of the unique indicator unit as provided by the invention, when mounted horizontally on a vertical wall as shown in FIG. 1. These two figures reveal graphically the small size and compactness of the unit, as it fits within the confines of the mounting aperture in the container wall. The prism body 54 has cylindrical walls 54a and 54b, and a mounting web 54c disposed between the walls 54a, 54b, that is, located intermediate the end portions of the prism. The mounting web 54c and prism 54 together constitute the bottom wall of the cup-like sensor body 52, and as presently understood, light rays as shown by the arrows in FIG. 34 pass through and are reflected by the prism 54 and the end wall thereof, to provide the desirable sensing properties of the unit for use with the electronic circuitry disclosed and described herein.

It has been found that an optimal angle between the axis of the cone surface 102 and that of both the light-emitting diode 56 and the photo-transistor 62 is around 9°. The angle which the surface of the conical recess makes with a transverse plane is optimally between 9° and 13°, typically 11°. With such an arrangement, it has been found that light rays being emitted by the light-emitting diode 56 are bent, by refraction, as they pass into the transparent material of which the sensor body 52 is molded. With the present arrangement, as they travel through the prism 54 toward the cone surface 102, they can be made substantially parallel to its axis. Similarly, reflected light rays travelling through the transparent material are bent as they leave the conical recess 104 and are received by the photo-transistor 62. They can be made to arrive substantially parallel to the axis of this latter component. The annular trough 106 intercepts some of the light emitted by the light-emitting diode 56; this intercepted light is scattered for the most part, and does not arrive at the cone surface 102. Accordingly the scattered light is not involved with the liquid level detecting operation. The distance between the cone surface 102 and conical recess 104 is about the same as the diameter of the cone surface 102 at its base. In addition, as noted above, the recess 104 is characterized by a true cone shape which is relatively flat with respect to that of the cone surface 102 of the prism 54.

Also, by the invention, we have discovered that by making the diameter of the cone surface 102 relatively small, and incorporating the shallow conical recess 104 noted above, together with the trough 106 and angularly disposed light-emitting diode 56 and photo-transistor 62, a surprisingly high resolution is obtainable, with excellent accuracy and repeatability. In particular, with actual models that have been constructed and tested, it has been determined that measurements can be accurately achieved, over as little as a 3 millimeter range measured transversely of the cone surface 102, when the diameter of the surface at its base is approximately ¼ inch.

Surrounding the cone surface 102 is an annular external trough 108, to inhibit the effects of capillarity which might otherwise lead to formation of small bridges of liquid between the cone surface 102 and the surrounding wall of the cup shaped sensor body 52.

Where gauging systems were employed with stationary tanks, there did not exist problems with erroneous readings resulting from sloshing or other movement of the liquid contained in such tanks. However, gauging systems adapted for use in automotive vehicle applications do present such problems. In particular, not only must the inclination of the vehicle be considered, but also the turbulence that occurs during engine operation. Additionally, a device that is permanently attached to a vehicle engine must be sufficiently rugged to withstand considerable shock and vibration, as well as standing up under the harsh temperature fluctuations that occur.

In accordance with the present invention, there is provided a novel and improved vehicle inclination detector 110 for use in combination with the liquid sensor unit 50 described above, and in addition, a control and indicator circuit shown in FIG. 32, in combination with the sensor unit 50, to eliminate erroneous readings that might otherwise occur due to either vehicle movement or tilting of the vehicle.

The vehicle inclination detector 110 is illustrated particularly in FIGS. 18–27. It comprises a two-part housing 112, 114 constituted of transparent or semi-transparent material. One part 112, shown in FIGS. 21–23, is preferably cup-shaped, having an annular inner shoulder 116 against which the second housing part 114 can seat. The part 114 shown in FIGS. 24–27 has a slab-like body, and has a conical recess 118 in its inner face. A sealing gasket 119 is disposed at the junction of the housing parts. The parts 112, 114 have hollow tubular extensions 120, 122 respectively which are substantially aligned with one another when the parts are assembled as in FIG. 18. The extension 122 is intended to receive a light-transmitter 124, with the other extension 120 providing a mounting for a light-receiver 126. An opaque light deflection member, preferably in the shape of a ball 128, is held captive in the housing when the two parts 112 and 114 are assembled. The leads 129, 130 of the light-transmitter 124 and the leads 132, 134 and 136 of the light-receiver 126 are bent at right angles, as shown in FIG. 18, for installation in a printed circuit board 138, for example. Preferably this board 138 has a rectangular cut-out 140 to receive one side of the housings 112, 114. That is, the housings extend partially through a rectangular opening 140 in the board 138 and the leads of the light-transmitter 124 and light-receiver 126 are inserted through holes in the board and soldered to the appropriate printed circuit tracks on the opposite side thereof.

The p.c. board 138 is mounted in a suitable location on the vehicle, preferably in a utility box (not shown) located either under the dashboard or in the engine compartment, with the conical recess 118 of the one housing part 114 facing upward along a substantially vertical axis when the vehicle is substantially horizontal. Under such circumstances, the ball 128 becomes seated by gravity, at the center of the conical recess 118, wherein it intercepts light from the light-transmitter 124 and prevents most of it from arriving at the light-receiver 126. However, when the vehicle tilts beyond a predetermined angle, for example 5° or 10°, depending on the depth or configuration of the conical recess 118, the ball 128 will shift by gravity, toward a radially outward position, such as shown in dotted outline in FIG. 18, and thus out of the path between the light-transmitter 124 and light-receiver 126. As will be explained further, according to the invention, the receiver 126 can provide information about the inclination of the vehicle, and this information in turn can be used to prevent the liquid gauge from providing a false reading to the vehicle's operator, as for example, when the vehicle is on an incline.

A series of radially-extending ribs 142, FIGS. 24, 26 and 27, may optionally be provided on the surface of the conical recess 118, to dampen movement of the ball 128 and thereby inhibit any tendency for wild oscillations to occur, as can be readily understood. In addition, support legs 144 and 146 can be provided on the housing part 112, for engagement by the board 138; similar legs 148 and 150 on the housing part 114 provide support thereto.

FIG. 32 is a schematic circuit diagram of an electronic control and indicator circuit intended for use with the sensor unit 50 and vehicle inclination detector 110 described above, and illustrates the interaction of the inclination detector 110 and the oil level sensor unit 50. The vehicle's battery 152, ignition switch 154, and driver's door jamb switch 156 are included in the figure. Also shown are the light-emitting diode 56, photo-transistor 62, resistor 70, light-transmitter 124 and light-receiver 126. The portion of the circuit lying within the dotted outline is preferably laid out on the printed circuit board 138 described above, which board also carries the inclination detector 110.

A total of 7 electrical terminals extends from the board 138. They are indicated by the numerals 158, 160, 162, 164, 166, 168 and 170, respectively. Terminal 164 leads to the vehicle's battery 152, and is preferably continuously connected therewith, through the usual fuses, fusible links and/or circuit breakers (not shown) that are normally provided on the vehicle. With suitable components, the passive current that is continuously drawn through terminal 164 can be kept to a minimum, typically under several milliamperes. This is sufficiently low so as not to cause any significant battery drain unless the vehicle is left unattended for an unusually long period of time.

A diode 172 connected to terminal 164 carries positive voltage from the vehicle's battery, also protecting the circuitry in dotted outline from inadvertent application of voltage of reverse polarity, or from negative voltage spikes which occur on the vehicle's electrical leads from time to time. Voltage regulation is provided by a zener diode 174, fed through a series resistor 176. Filtering is provided by capacitor 178. The junction of the Zener diode 174 and capacitor 178 thus constitutes a continuously energized, regulated, positive supply line 180 for all the control and indicator circuitry shown within the dotted outline in FIG. 32. The terminal at line 180 labelled "B+" is connected to six other terminal points on the diagram and having a similar "B+" designation.

As will be explained in more detail below, the light source comprising the light-emitting diode 56 is energized for a predetermined time interval following opening of the driver's door, such energization occurring through a switching transistor 182 and series resistor 184. Simultaneously, the light-transmitter, comprising light-emitting diode 124, is energized through series resistor 186. The base of transistor 182 is connected with a resistor 188 that extends to terminal 160, which is normally at the potential of the positive supply line 180, but which is grounded through the door jamb switch 156 when it is closed as a consequence of the driver's door being opened.

Resistor 70 is connected between the base and emitter of photo-transistor 62. As noted above, it is conveniently located in the sensor unit 50, being in series with lead 66 of the photo-transistor 62, FIGS. 1 and 3. The collector of the photo-transistor 62 is connected to terminal 162 through prong 26. This terminal 162 extends to a load resistor 190 connected to the positive supply line 180, and through first and second series resistors 192 and 194, respectively, to one input 196 of a flip-flop 198 comprising interconnected NAND gates 200 and 202. A diode 204 is connected from the junction of these two series resistors 192, 194 to terminal 160, as shown, and a capacitor 206 extends to the supply line 180. The output 207 from NAND gate 202 is fed through resistor 208, to the gate of a transistor 210, constituting a switch. The drain of transistor 210 extends to terminal 168, and is arranged to drive either an on-board module on the automotive vehicle, known as a "driver information center" (not shown), which in turn would operate the indicator lamp on the vehicle dashboard, or alternately to drive the indicator lamp 212 directly, as shown in FIG. 32, through terminal 168. The source of the transistor 210 is grounded, through terminal 170. The other input to the flip-flop 198 is indicated 214. The output 216 of NAND gate 200 is connected to an input 218 of NAND gate 202, and the output 207 of NAND gate 202 is similarly connected to the input 222 of NAND gate 200, as shown in the diagram.

Connected to terminal 158 is a diode 224, which applies positive (battery) voltage from the ignition switch 154 when the latter is closed, also protecting the circuit in dotted outline from application of voltage of reverse polarity. Connected to the diode 224 are resistors 226 and 228, the latter extending to the input 230 of another NAND gate 232. Connected from this input 230 to ground are a capacitor 234 and a resistor 236. Input 240 extends to supply line 180.

The output 238 from the NAND gate 232 has a bypass capacitor 242, and is arranged to selectively clamp the gate of transistor 210 through a diode 244. The output 238 is also connected to the input 214 of the NAND gate 200 through another diode 246. A resistor 248 is connected from the input 214 of the NAND gate 200 to the supply line 180. A coupling capacitor 250 extends between terminal 160 and the input 214 of the NAND gate 200. With the driver's door closed, terminal 160 is normally at a voltage equal to that on line 180, by virtue of resistor 252.

The light-receiver or photo-transistor 126 associated with the vehicle inclination detector 110 has a resistor 254 from the base to ground, as shown, and its emitter is connected to both inputs of a fourth NAND gate 256. A resistor 258 constitutes a load for the transistor 126. The output 260 of the fourth NAND gate 256 is connected through a diode 262 to the gate of the transistor 210, as shown.

The operation of the improved sensor unit 50, inclination detector 110, and control and indicator circuit of FIG. 32 will now be described in more detail As noted above, the sensor unit 50 of FIG. 1 is preferably mounted in the vertical wall of the tank or vessel being monitored, such as an automotive vehicle's oil pan. Under this circumstance the axis of the conical forward end portion of the prism 54 will lie along a substantially horizontal line.

The control circuit shown in FIG. 32 is so arranged that readings of oil level occur for a brief interval after the vehicle's door on the driver's side of the car is opened; if the vehicle's oil level is low, then the indicator lamp 212 will become illuminated (after closing of the ignition switch 154), and will remain in that condition until there has elapsed a predetermined interval, typically 30 seconds, following turning on of the ignition switch 154.

As illustrated in FIG. 32, the drain of transistor 210 is connected with the indicator lamp 212, and this in turn is energized through the ignition switch 154. With the vehicle idle, the door jamb switch 156 is open, and the ignition switch 154 is open. Input terminal 214 of NAND gate 200 is at a high digital level as a result of the connection to the supply line 180 through resistor 248. Diode 246 is not conducting at this time, since the output of NAND gate 232 is high, as will be explained below. Input terminal 196 of NAND gate 202 is also high as a result of the bias applied through diode 204 and resistor 252. The output terminal 207 on NAND gate 202 can be either high or low; the level on the output 216 of the other NAND gate 200 will be the inverse; that is if output on gate 202 is high, the output on gate 200 will be low, and vice-versa. The indicator lamp is 212 not eve illuminated when the ignition switch 154 has not been closed.

Assuming for the moment that the vehicle is on level ground, the output 260 of NAND gate 256 will be high, and diode 262 will not conduct. The NAND gate 256 and diode 262 are part of the vehicle's inclination sensor circuitry, and its operation will be explained below.

A reading of the oil level occurs when the vehicle operator first opens the driver's door, which results in closing of the door jamb switch 156. This operation accomplishes several functions. A negative-going pulse is applied through the coupling capacitor 250 to the input terminal 214 of NAND gate 200, which re-sets the flip-flop 198; in addition, the closing of switch 156 grounds one terminal of resistor 188, causing transistor 182 to conduct. The conduction of this transistor energizes both light-emitting diodes 56 and 124. The light-emitting diode 56 is associated with the sensor unit 50. Rays of light from the light-emitting diode 56 impinge upon the surface of the conical recess 104, FIG. 1, and as they pass trough such surface and into the prism 54, they are bent, by refraction, so as to be generally parallel to the axis of the con surface 102. If the level of oil is above a certain, predetermined point on the cone surface 102, insufficient light will be internally reflected off the interface between the cone surface 102 and the oil, to drive the light sensor or photo-transistor 62, and accordingly it will not conduct. Thus, terminal 162 is not pulled down to a low digital voltage level by photo-transistor 62, and the input 196 of NAND gate 202 remains high, causing its output 207 to drop to a low digital level. On the other hand, if the oil level is low, the intensity of the rays striking photo-transistor 62 is increased, and terminal 162 will be pulled down, driving the input terminal 196 of NAND gate 202 to a low digital level. This in turn causes the output 207 of NAND gate 202 to assume a high digital level, which is sufficient to apply gear drive to transistor 210 (through resistor 208) if neither diode 244 nor 262 is conducting. However, lamp 212 does not indicate the low oil level until several other conditions are met.

When the operator enters the vehicle and closes the door, the reading noted by the flip-flop 198 comprising NAND gates 200 and 202 is retained or stored, since nothing has occurred which would reset the flip-flop.

Closing of the ignition switch 154 also accomplishes several functions. It connects one terminal of the indicator lamp 212 to the vehicle battery 152. If the transistor 210 has gate drive, the indicator lamp 212 will illuminate at the moment when the ignition switch 154 is closed, giving notice to the vehicle operator that the oil level is below normal.

In addition, turning on the ignition switch 154 applies a positive voltage through diode 224 and resistor 228, to input 230 of NAND gate 232. Prior to closing of the ignition switch 154, the output 238 of NAND gate 232 had been low; since its input 240 was high, its output 238 was also high. Diode 244 thus does not conduct at this time of interfere with the gate voltage on transistor 210, or disrupt the illumination of indicator lamp 212. Also, after the ignition switch is closed, capacitor 234 begins to charge at a rate determined by its value and the value of resistor 228. The time constant of this circuit results in a delay of about 30 seconds, after which the output 238 of NAND gate 232 assumes a low digital level, causing conduction of diode 244. This in turn clamps the gate voltage of transistor 210 to a low digital level, causing the transistor 210 to cease conduction. The indicator lamp 212 is thus turned off following this delay, typically 30 seconds.

In the above discussion it has been assumed that the output 260 of the NAND gate 256 is high, and that diode 262 does not conduct. This presumes that the vehicle has been substantially horizontal, as opposed to being parked on a hill.

It can be appreciated that if the vehicle is on an incline, the sensor unit 50, being mounted in a vertical wall of the oil pan, will not provide an accurate reading. Stated differently, the unit 50 may be completely immersed, even though the oil level is low, or it may be completely exposed, when the oil level is normal or higher than normal.

In order to compensate for such conditions, by the invention, the gate of transistor 210 is clamped by the output of the NAND gate 260, through diode 262, when the vehicle inclination sensor 110 detects vehicle slope. When the slope is sufficient to cause shifting of the ball 108, FIG. 18, out of the path between the light-transmitter 124 and light receiver 126, the switching on of the light-transmitter 124, which occurs when the vehicle's door is opened (through transistor 182), illuminates the light receiver 126 sufficiently to cause it to conduct, providing high digital levels on both inputs of the NAND gate 256, FIG. 32. Accordingly, the output 260 assumes a low digital level, and through diode 262, clamps the gate of transistor 210 sufficiently to prevent it from conducting and causing illumination of the indicator lamp 212. The latter will thus not be energized when the vehicle is on a sloping surface, regardless of the oil level in the pan. The disclosed arrangement is considered to constitute an important feature of the invention, since false readings are prevented. In the absence of such a circuit, oil level readings would be largely dependent on the inclination of the vehicle, rather than on the amount of oil in the pan. It can be readily seen that any type or monitor which is influenced by vehicle inclination would be characterized by serious deficiencies, and would lead to confusion on the part of the vehicle operator.

Another embodiment of the invention is shown in FIG. 33 which diagrammatically illustrates a vehicle 266 and the filler pipe 268 of the vehicle's fuel rank 270; also shown are the usual screw cap 272 and hinged body panel 274, which in some models, takes the form of a hinged license plate panel. By the invention, there are provided means responsive to either the actuation of the body panel 274 or the unscrewing and removal of the cap 272, for providing a triggering signal which will initiate a reading of the level of liquid contained in a vessel carried on the vehicle. In the present instance, such vessel is shown as being the vehicle's oil pan. In carrying out the invention, there is provided a switch 276 associated with both the cap 272 and body panel 274. This may take the form of a reed switch mounted on the neck 268, adjacent the cap. In a preferred embodiment, the reed switch would have SPST contacts 278, 280 that are held open by their proximity to one or more magnets permanently mounted on or in the cap. When the latter was turned and removed, the reed switch contacts 276, 278 would close. This arrangement could be substituted for that shown in FIG. 32, wherein the switch 276 would be connected between ground and terminal 160, and the existing connection to the door jamb switch 156 omitted.

Such an arrangement has the advantage that each time a vehicle is re-fueled, an oil level reading would automatically be initiated. Since most service stations have relatively flat, level platforms from which gas r fuel is dispensed, the likelihood of the vehicle being inclined from a true horizontal position is minimized. Accordingly erroneous readings due to tilting of the vehicle would not be likely to occur.

A magnet-operated reed switch would also have the advantage that the switch contacts are completely sealed from the surrounding neck. Thus any arcing which occurred would be completely isolated from fuel vapors at the neck, thereby eliminating the possibility of explosion, etc.

It can be readily understood that other systems could be employed to trigger an oil level reading at the time that fuel is being introduced into a vehicle. The disclosed embodiment is intended to illustrate a construction which is both simple and readily workable.

The components comprising the body 52, light source 56 and light-sensor 62, and carrier block constitute sub-assemblies of the liquid gauge sensor unit of the invention, as can be readily understood.

Another embodiment of the invention is illustrated diagrammatically in FIG. 35, which shows a modification incorporating a cup-shaped body 52c, prism 54c in its bottom wall, and in addition to the conical recess 104c, a tapered bore or blind hole 282 at the base of the recess 104c. The inclusion of the bore has been found to simplify the molding of the body 52c. The light source 56 and light-sensor 62 shown in FIG. 34 have been omitted from FIG. 35, for purposes of clarity. The modification illustrated in FIG. 35 could readily be substituted for that of FIG. 34, with similar results being obtainable.

From the above it can be seen that there has been provided a novel and improved liquid gauging system especially adapted for use with automotive vehicles, the system being both simple in construction and reliable in operation. In one embodiment, an oil level reading is taken each time that the vehicle operator's door is opened; such reading is held or stored by a flip-flop, and this stored information is later displayed by an indicator lamp 212 preferably located on he vehicle's dashboard. Following closing of the ignition switch 154, the display commences and continues for a short time interval, typically 30 seconds. This is considered sufficiently long to permit the operator to note the presence or absence of a reading on a lamp. Readings are not conveyed to the operator if the vehicle is not disposed on a substantially horizontal level, thereby avoiding confusion or misinterpretation by him or her.

Clearly, other types of indicators could be employed, such as buzzers, chimes, voice synthesizer devices, etc., to be substituted for the lamp 212 shown in FIG. 32.

While the gauge of the invention is especially well suited for use where its fitting 10 is to be mounted on a side wall of a vessel, with its axis substantially horizontal, it also lends itself to applications involving other mounting positions. For example, the fitting could be installed in a wall of a tank or vessel so as to lie along a generally vertical axis, or even along axes having varying degrees of inclination, as dictated by the particular configuration of the vessel and the location of the vessel aperture in which the fitting it to be mounted.

The disclosed systems are thus seen to constitute a distinct advance and improvement in the field of liquid gauges.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. An indicator for displaying when the height of a liquid in a vessel reaches a preselected height, said vessel having a wall and said indicator comprising in combination:
   (a) a cup-like enclosure having a bottom wall comprising prism means having exterior and interior surfaces, the exterior surface of said prism means being conical and being located for immersion in the liquid to be monitored when said liquid reaches said preselected height,
   (b) a light source,
   (c) a light-responsive means, and
   (d) means for mounting said light source and light-responsive means in close juxtaposition adjacent said prism means and in said cup-like enclosure,
   (e) the interior surface of said prism means having a light-admitting substantially conically-shaped recess which is substantially coaxial with the conical exterior surface of the prism means, said prism means enabling light rays from said light source to pass into the surface of its conically-shaped recess and to be bent, by refraction, to strike the conical exterior surface of the prism means and said prism means enabling reflected rays from said conical exterior surface of the prism means to pass through the surface of said conically-shaped recess and to be thereby bent, by refraction, to strike the said light-responsive means so as to indicate the presence or absence of liquid at the conical exterior surface of said prism means.

2. The invention as set forth in claim 1, wherein:
   (a) said light source directs rays of light onto the surface of said conically-shaped recess.

3. The invention as set forth in claim 1, wherein:
   (a) said prism means has an annular internal trough surrounding said conically-shaped recess.

4. The invention as set forth in claim 3, wherein:
   (a) said prism means has an annular external trough surrounding its conical exterior surface.

5. The invention as set forth in claim 1, and further including:
   (a) electrical connection means extending to the light source for energizing the same, and to the light-responsive means for monitoring the condition thereof.

6. The invention as set forth in claim 1, wherein:
   (a) said mounting means comprises a carrier block received in the enclosure through the open end thereof,
   (b) said carrier block comprising a cradle for said light source and said light-responsive means.

7. A liquid indicator for displaying when the height of liquid in a vessel reaches a preselected height, comprising in combination:
   (a) a light source,
   (b) light-responsive means,
   (c) prism means having two ends, one end being conical and located for immersion in the liquid to be measured when the liquid reaches said predetermined height,
   (d) said prism means having at its other end a conically-shaped recess, and
   (e) means disposed at said other end of the prism means adjacent the conically-shaped recess thereof, mounting said light source and said light-responsive means in close juxtaposition adjacent said prism means, said prism means enabling light from the source to enter the prism means through one portion of the conically-shaped recess, strike the said conical end, and be refracted therefrom so as to exit from the prism means at another portion of the conically-shaped recess and thereafter strike the said light-responsive means.

8. The invention as set forth in claim 7, wherein:
   (a) said prism means has a bore whose opening is disposed in the conically-shaped recess.

9. The invention as set forth in claim 8, wherein:
   (a) said bore is tapered.

10. The invention as set forth in claim 7, wherein:
    (a) said prism means has a blind hole whose opening is disposed in said conically-shaped recess.

11. A liquid indicator for displaying when the height of liquid in a vessel reaches a preselected height, comprising in combination:
    (a) a rigid metal supporting fitting having a substantially cylindrical body portion with external threads by which it can be secured in an aperture in the vessel wall,
    (b) said body portion having a through bore and a lip at its inner end,
    (c) prism means of light-conducting material and means mounting the prism means in said body portion adjacent the said lip, said prism means having a substantially conical exterior light-conducting end portion located for immersion in the liquid to be monitored when the liquid reaches said preselected height,
    (d) a light source and a light-responsive means mounted side by side in and located within the confines of the body portion of the fitting,
    (e) the conical exterior end portion of the prism means being substantially completely recessed within said lip of the body portion such that the latter protects the prism means from inadvertent damage due to bumping, jarring or contact with other objects during handling, but does not interfere with contact of said prism means by said liquid.

12. A liquid indicator for displaying when the height of liquid in a vessel reaches a preselected height, comprising in combination:
    (a) a cup-shaped, hollow body of material having light-transmitting properties and having a transverse bottom wall comprising a prism means,
    (b) a light-emitting device and a light-responsive device mounted side by side in said cup-shaped body and in close juxtaposition to the prism means at the bottom wall of the said hollow body, to respectively supply light to and receive light from said prism means.

13. The invention as set forth in claim 12, wherein:
    (a) the prism means has a recess in the wall facing the light-emitting device and light-responsive device.

14. The invention as set forth in claim 13, wherein:
    (a) the light-emitting device and light-responsive device are angularly disposed with respect to each other, and
    (b) the said recess in the prism means has a conically-shaped surface.

15. The invention as set forth in claim 12, wherein:
    (a) the prism means has means disposed intermediate its ends, for mounting it.

16. The invention as set forth in claim 12, wherein:
    (a) the said cup-shaped body is molded of light-transmitting plastic.

17. A liquid indicator for displaying when the height of liquid in a vessel reaches a preselected height, said vessel having a vertical side wall, said indicator comprising, in combination:
    (a) a liquid level sensor carried by said side wall,
    (b) said sensor comprising a cup-shaped hollow body having its axis substantially perpendicular to said side wall,
    (c) said hollow body having a transverse bottom wall comprising a prism means, and
    (d) a light-emitting device and a light-responsive device and means mounting said devices such that they lie wholly within the cup-shaped hollow body, and are mounted in side by side relation therein and in close juxtaposition to said prism means at the transverse bottom wall of the said hollow body, to respectively supply light to and receive light from said prism means thereby to indicate the presence or absence of liquid around the prism means.

18. A liquid indicator for displaying when the height of liquid in a vessel reaches a preselected height, said indicator comprising in combination:
    (a) a light source,
    (b) light-responsive means,
    (c) prism means having two ends, one end being conical and located for immersion in the liquid to be indicated when the liquid reaches aid preselected height,
    (d) said prism means having at its other end an annular light-intercepting and scattering trough, and
    (e) means disposed at said other end of the prism means adjacent the annular trough thereof, mounting said light source and said light-responsive means whereby light from the source can in part be intercepted by said trough and in part can enter central portions of the prism means, said light that enters central portions of the prism means striking the said conical end and being refracted therefrom so as to reversely exit from the prism means and thereafter strike the said light-responsive means.

19. A liquid indicator for displaying when the height of liquid in a vessel reaches a preselected height, said indicator comprising in combination:
    (a) a light source,
    (b) light-responsive means,
    (c) prism means having two ends, one being conical and located for immersion in the liquid to be indicated when the liquid reaches said preselected height,
    (d) said prism means having an annular external peripheral trough surrounding said conical end, thereby to inhibit the effects of capillarity of the liquid adjacent said prism means, and
    (e) means disposed at said other end of the prism means, mounting said light source and said light-responsive means whereby light from the source can enter the prism means and strike the said conical end, and be refracted therefrom so as to reversely exit from the prism means and thereafter strike the said light-responsive means.

* * * * *